(12) United States Patent
Lv et al.

(10) Patent No.: US 12,413,824 B2
(45) Date of Patent: Sep. 9, 2025

(54) VOLUME ADJUSTMENT METHOD AND SYSTEM, AND ELECTRONIC DEVICE

(71) Applicant: Huawei Technologies Co., Ltd., Shenzhen (CN)

(72) Inventors: Shuailin Lv, Beijing (CN); Feiran Sun, Shenzhen (CN); Dajun Ding, Shenzhen (CN); Weixiang Hu, Beijing (CN); Yunchao Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 39 days.

(21) Appl. No.: 18/552,736

(22) PCT Filed: Mar. 30, 2022

(86) PCT No.: PCT/CN2022/084003
§ 371 (c)(1),
(2) Date: Sep. 27, 2023

(87) PCT Pub. No.: WO2022/206825
PCT Pub. Date: Oct. 6, 2022

(65) Prior Publication Data
US 2024/0171826 A1    May 23, 2024

(30) Foreign Application Priority Data
Mar. 31, 2021    (CN) .......................... 202110353347.4

(51) Int. Cl.
*H04N 21/485*    (2011.01)
*G06F 3/16*    (2006.01)
*H04N 21/422*    (2011.01)

(52) U.S. Cl.
CPC ......... *H04N 21/4852* (2013.01); *G06F 3/165* (2013.01); *H04N 21/42203* (2013.01)

(58) Field of Classification Search
CPC .......... H04N 21/4852; H04N 21/42203; G06F 3/165
See application file for complete search history.

(56) References Cited

U.S. PATENT DOCUMENTS

2019/0372541 A1\* 12/2019 Friant ..................... G10L 25/78
2020/0068303 A1    2/2020 Wilson
(Continued)

FOREIGN PATENT DOCUMENTS

CN    101442636 A    5/2009
CN    101795323 A    8/2010
(Continued)

OTHER PUBLICATIONS

English Translation of CN-115734128-A (Foreign Application Priority Data 202110988988.7 of US Pub. No. 20240192916 (Year: 2021).\*

(Continued)

*Primary Examiner* — Kyu Chae
(74) *Attorney, Agent, or Firm* — Slater Matsil, LLP

(57) ABSTRACT

Embodiments of this application provide a volume adjustment method and an electronic device. The volume adjustment method includes: receiving target volume used when a media playing device plays content; obtaining an audio signal, where the audio signal includes a first signal and a second signal, the first signal is a sound signal that is collected by a wearable device worn by a user and that is generated when the media playing device plays the content, and the second signal is a noise signal collected by the wearable device; determining adjusted volume based on the audio signal and the target volume; and sending the adjusted volume to a target device through a communication con- (Continued)

nection to the target device, where the adjusted volume is used to update volume used when the media playing device plays the content.

16 Claims, 8 Drawing Sheets

(56) References Cited

U.S. PATENT DOCUMENTS

| | | | | |
|---|---|---|---|---|
| 2022/0141527 | A1* | 5/2022 | Channapragada | G11B 27/36 725/18 |
| 2024/0192916 | A1* | 6/2024 | Law | G06F 3/165 |

FOREIGN PATENT DOCUMENTS

| | | | | |
|---|---|---|---|---|
| CN | 104092775 | A | | 10/2014 |
| CN | 104683467 | A | | 6/2015 |
| CN | 104866078 | A | | 8/2015 |
| CN | 107229326 | A | | 10/2017 |
| CN | 108810614 | A | | 11/2018 |
| CN | 109246469 | A | | 1/2019 |
| CN | 109287140 | A | | 1/2019 |
| CN | 110022487 | A | | 7/2019 |
| CN | 110324498 | A | | 10/2019 |
| CN | 111510846 | A | | 8/2020 |
| CN | 111556422 | A | | 8/2020 |
| CN | 115734128 | A | * | 3/2023 ............ G02C 11/10 |
| KR | 20210009958 | A | | 1/2021 |

OTHER PUBLICATIONS

CN115734128A (Year: 2021).*
CN115734128A English Translation (Year: 2021).*

* cited by examiner

CONT. FROM FIG. 6B

CONT. FROM FIG. 6B

CONT. FROM FIG. 6B

S608: The mobile phone sends the adjusted volume to the smart band through the communication connection to the smart band, and correspondingly, the smart band may receive the adjusted volume from the mobile phone through the communication connection to the mobile phone S609: The smart band sends a volume adjustment instruction to the smart screen device, and correspondingly, the smart screen device receives the volume adjustment instruction from the smart band S610: The smart screen device adjusts volume of the smart screen device in response to the volume adjustment instruction

FIG. 6C

VOLUME ADJUSTMENT METHOD AND SYSTEM, AND ELECTRONIC DEVICE

CROSS-REFERENCE TO RELATED APPLICATIONS

This application is a National Stage of International Application No. PCT/CN2022/084003, filed on Mar. 30, 2022, which claims priority to Chinese Patent Application No. 202110353347.4, filed on Mar. 31, 2021. Both of the aforementioned applications are hereby incorporated by reference in their entireties.

TECHNICAL FIELD

This application relates to the field of smart home technologies, and in particular, to a volume adjustment method and system, and an electronic device.

BACKGROUND

A smart screen device is also referred to as a smart screen. Different from a conventional television product, the smart screen device will play more roles in a home. The smart screen device is not only a multimedia entertainment center in the home, but also an information sharing center, a control management center, and a multi-device interaction center.

Currently, when the smart screen device plays a video/audio clip, a user may adjust playing volume of the smart screen device by using a button on a remote control of the smart screen device or by using a touch control of a touchscreen of a mobile terminal connected to the smart screen device. For example, when the user is far away from the smart screen device, to hear clearly, the user may manually adjust the touch control, to increase the volume of the smart screen device. When the user is close to the smart screen device, to avoid hearing damage, the user may manually adjust the touch control, to decrease the volume of the smart screen device. In addition, a distance between the user and the smart screen device may be detected by using a distance sensor disposed on the smart screen device. Then, the smart screen device automatically adjusts the playing volume of the smart screen device based on the distance between the user and the smart screen device, to implement automatic adjustment of the volume. However, in this manner, impact of ambient noise on the playing volume is not considered. As a result, the ambient noise is excessively high, and consequently, the user still cannot clearly hear a sound of the video/audio clip played by the smart screen device.

SUMMARY

This application provides a volume adjustment method and system, and an electronic device, to resolve a problem, in the conventional technology, that a volume adjustment effect is poor.

To achieve the foregoing objective, this application uses the following technical solutions.

According to a first aspect, a volume adjustment method is provided, applied to a first electronic device. The method includes: receiving target volume used when a media playing device plays content; obtaining an audio signal, where the audio signal includes a first signal and a second signal, the first signal is a sound signal that is received on a user side and that is generated when the media playing device plays the content, and the second signal is a noise signal on the user side; determining adjusted volume based on the audio signal and the target volume; and sending the adjusted volume to a target device through a communication connection to the target device, where the adjusted volume is used to update volume used when the media playing device plays the content.

When the first electronic device is a wearable device, the target device is the media playing device. When the first electronic device is an electronic device other than the wearable device, the target device is the media playing device or the wearable device.

For example, the content played by the media playing device may be a voice file, for example, a song, or may be a video file.

The target volume may be an audio parameter used when the media playing device is playing audio/video data, namely, current volume. Specifically, the target volume may be sent by the media playing device.

The adjusted volume is finally determined based on ambient noise on the user side, the target volume, and the sound signal that is received on the user side and that is generated when the media playing device plays the content, so that the media playing device can update, based on the adjusted volume, the volume used when the media playing device plays the content. Therefore, the volume adjustment solution is more robust, and the user can clearly hear the sound played by the media playing device.

In a possible implementation of the first aspect, the first electronic device is the wearable device, the audio signal is collected by the wearable device, and the determining adjusted volume based on the audio signal and the target volume includes: sending the audio signal and the target volume to a second electronic device; and receiving the adjusted volume from the second electronic device, where the adjusted volume is determined by the second electronic device based on the audio signal and the target volume.

Only the audio signal on the user side collected by the wearable device is used, and a device with a stronger computing capability or processing capability is used to complete a signal separation and volume adjustment process. This can ensure a volume adjustment effect, and can resolve a problem that the signal separation and volume adjustment functions cannot be deployed due to a weak computing capability or processing capability of the wearable device like a band.

In a possible implementation of the first aspect, the determining adjusted volume based on the audio signal and the target volume includes: separating out the first signal and the second signal from the audio signal; and determining the adjusted volume based on the target volume, the first signal, and the second signal. The separating out the first signal and the second signal from the audio signal may be implemented according to a blind source separation algorithm.

The determining the adjusted volume based on the target volume, the first signal, and the second signal includes:
  determining received volume based on the first signal;
    determining an adjustment base based on the received volume and the target volume; determining an enhancement value based on a noise signal on the user side; and determining the adjusted volume based on the adjustment base and the enhancement value.

An audio clip is evaluated based on the target volume and the received sound signal, to determine the adjustment base, and then the enhancement value determined based on the noise signal on the user side is combined, to finally determine the adjusted volume, so that the volume played by the media playing device can be effectively adjusted to a degree at which the user can hear clearly.

In a possible implementation of the first aspect, that the adjustment base is determined based on volume of the first sound signal and the target volume includes: determining a volume weakening degree based on the received volume and the target volume; and determining the adjustment base based on the volume weakening degree.

In a possible implementation of the first aspect, the determining an enhancement value based on a noise signal on the user side includes: determining a noise intensity level based on the noise signal on the user side; and determining the enhancement value based on the noise intensity level.

In this embodiment of this application, an association table between the enhancement value and the noise intensity level may be preset, and the enhancement value corresponding to the noise intensity level can be determined by looking up the table. Specifically, the noise intensity on the user side is classified into several intensity levels, and then each intensity level corresponds to an enhancement value. For example, the noise intensity on the user side is classified into four intensity levels: N1, N2, N3, and N4. An enhancement value corresponding to the intensity level N1 is D1, an enhancement value corresponding to the intensity level N2 is D2, an enhancement value corresponding to the intensity level N3 is D3, and an enhancement value corresponding to the intensity level N4 is D4. It should be noted that a level classification standard of the noise intensity on the user side may be determined based on an actual scenario, and a specific value of an enhancement value corresponding to each intensity level may be determined based on an actual situation. This is not limited herein.

According to a second aspect, this application provides a volume adjustment method, applied to a media playing device. The media playing device plays content. The method includes: The media playing device sends first information. The first information is used to determine target volume used when the media playing device plays the content. The media playing device receives a volume adjustment instruction from a first electronic device through a communication connection to the first electronic device. The volume adjustment instruction includes adjusted volume, and the volume adjustment instruction is used to trigger the media playing device to adjust, based on the adjusted volume, volume used when the media playing device plays the content. In response to the volume adjustment instruction, the media playing device adjusts, based on the adjusted volume, the volume used when the media playing device plays the content.

In an example, the first information may be the target volume used when the media playing device plays the content, or the first information may be a parameter indicating the target volume used when the media playing device plays the content. For example, if each of one or more pieces of volume is associated with an indicator, for example, volume 1 is associated with 001, the first information may be 001.

According to a third aspect, this application provides a volume adjustment system. The system includes a first electronic device and a media playing device, there is a communication connection between the first electronic device and the media playing device, the media playing device plays content at target volume, and the media playing device is configured to send, to the first electronic device, the target volume used when the media playing device plays the content.

The first electronic device is configured to: receive the target volume used when the media playing device plays the content; collect an audio signal, where the audio signal includes a first signal and a second signal, the first signal is a sound signal that is collected by a wearable device worn by a user and that is generated when the media playing device plays the content, and the second signal is a noise signal collected by the wearable device; determine adjusted volume based on the audio signal and the target volume; and send the adjusted volume to the media playing device through the communication connection, where the adjusted volume is used to update volume used when the media playing device plays the content.

The media playing device is further configured to: in response to the received adjusted volume, adjust, based on the adjusted volume, the volume used when the media playing device plays the content.

In a possible implementation of the third aspect, the system further includes a second electronic device, and there is a communication connection between the second electronic device and the first electronic device.

That the first electronic device is configured to determine adjusted volume based on the audio signal and the target volume specifically includes: The first electronic device is configured to send the audio signal and the target volume to the second electronic device.

The second electronic device is configured to: determine the adjusted volume based on the audio signal and the target volume, and send the adjusted volume to the first electronic device.

In a possible implementation of the third aspect, the determining adjusted volume specifically includes: The first electronic device or the second electronic device is configured to: separate out a first signal and a second signal from the audio signal; and determine the adjusted volume based on the target volume, the first signal, and the second signal.

The determining the adjusted volume based on the target volume, the first signal, and the second signal includes: determining received volume based on the first signal; determining an adjustment base based on the received volume and the target volume; determining an enhancement value based on a noise signal on a user side; and determining the adjusted volume based on the adjustment base and the enhancement value.

The determining an adjustment base based on the received volume and the target volume includes: determining a volume weakening degree based on the received volume and the target volume; and determining the adjustment base based on the volume weakening degree.

The determining an enhancement value based on a noise signal on a user side includes: determining a noise intensity level based on the noise signal on a user side; and determining the enhancement value based on the noise intensity level.

According to a fourth aspect, an electronic device is provided, including:

a receiving module, configured to receive target volume used when a media playing device plays content;

an obtaining module, configured to obtain an audio signal, where the audio signal includes a first signal and a second signal, the first signal is a sound signal that is collected by a wearable device worn by a user and that is generated when the media playing device plays the content, and the second signal is a noise signal collected by the wearable device;

a determining module, configured to determine adjusted volume based on the audio signal and the target volume, where the adjusted volume is determined based on the audio signal and the target volume; and a sending module, configured to send the adjusted volume to a target device through a communication connection to the target device, where the adjusted volume is used to update volume used when the media playing device plays the content.

When the first electronic device is the wearable device, the target device is the media playing device.

When the first electronic device is an electronic device other than the wearable device, the target device is the media playing device or the wearable device.

According to a fifth aspect, an electronic device is provided, including a processor and a memory. The processor is coupled to the memory, and the memory is configured to store computer program instructions. When the processor executes the computer program instructions, a terminal device is enabled to perform the method according to any one of the designs of the first aspect or the second aspect.

According to a sixth aspect, a computer program product including instructions is provided. When the computer program product runs on a computer, the computer is enabled to perform the method according to any one of the designs of the first aspect or the second aspect.

According to a seventh aspect, a chip is provided. The chip includes a processor. When the processor executes instructions, the processor is configured to perform the method according to any one of the designs of the first aspect or the second aspect. The instructions may be from an internal memory of the chip or an external memory of the chip. Optionally, the chip further includes an input/output circuit.

For technical effect of any design of the second aspect to the seventh aspect, refer to the technical effect of the method corresponding to the first aspect in the foregoing descriptions. Details are not described herein again.

BRIEF DESCRIPTION OF THE DRAWINGS

FIG. 6A to FIG. 6C are a schematic flowchart of another volume adjustment method according to an embodiment of this application.

DETAILED DESCRIPTION OF ILLUSTRATIVE EMBODIMENTS

Figure 1:
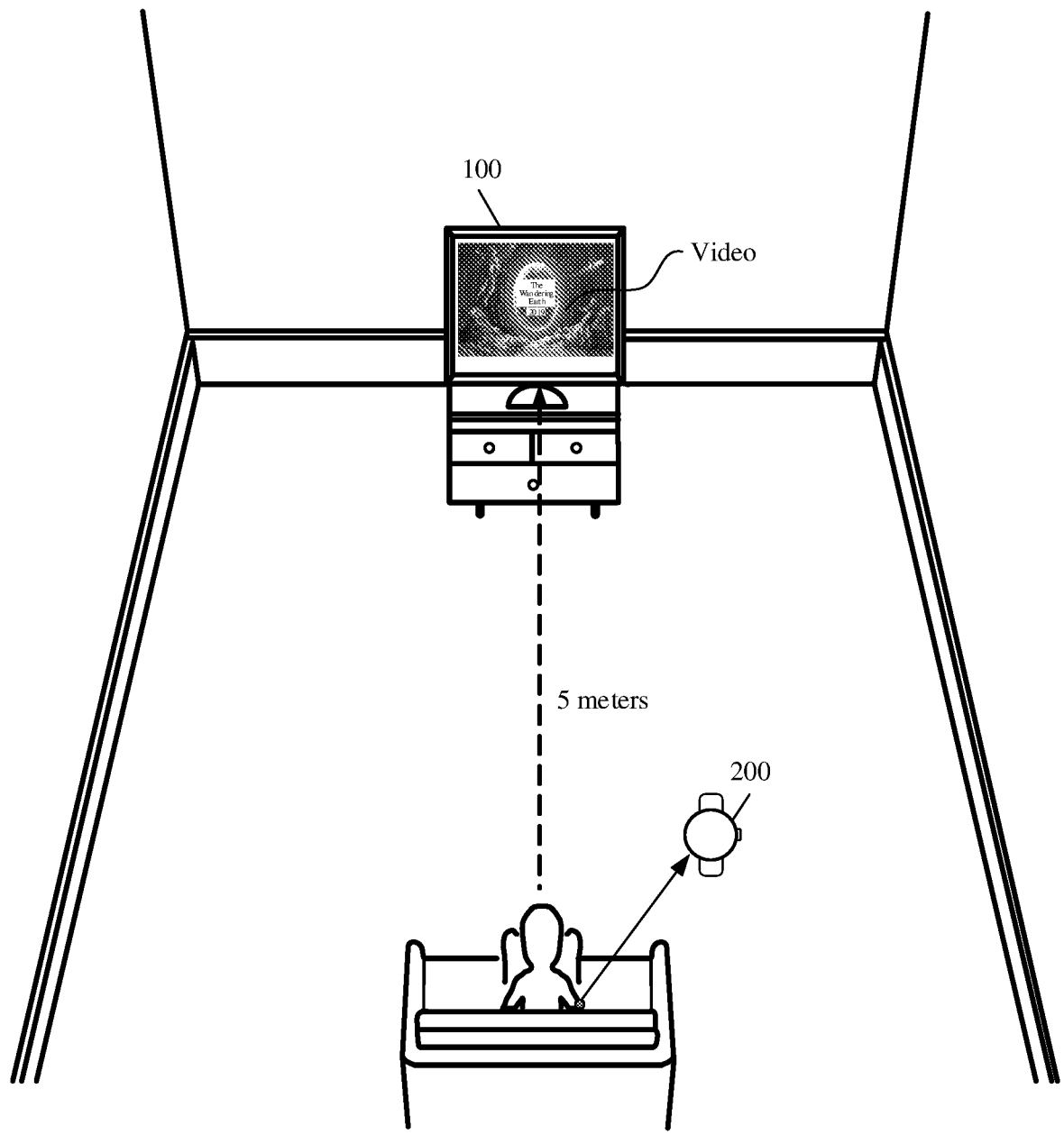
FIG. 1 is a schematic diagram of a scenario according to an embodiment of this application.

In descriptions of this application, unless otherwise specified, "/" means "or". For example, A/B may indicate A or B. A term "and/or" in this specification describes only an association relationship between associated objects and indicates that there may be three relationships. For example, A and/or B may indicate the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

It should be noted that, in this application, terms such as "an example" or "for example" are used to indicate an example, an instance, or an illustration. Any embodiment or design scheme described as an "example" or "for example" in this application should not be explained as being more preferred or having more advantages than another embodiment or design scheme. To be precise, the word like "example" or "for example" is intended to present a related concept in a specific manner.

It should be understood that specific embodiments described herein are merely used to explain this application but are not intended to limit this application.

A smart screen device is an upgrade of a conventional television. In addition to an audio/video playing function of the conventional television, the smart screen device can also implement a plurality of functions such as device interaction and control, and information sharing.

In various life scenarios such as watching a television program by using the smart screen device and performing exercise and fitness with a person in a video played by the smart screen device, a user adjusts playing volume based on a requirement of the user. For example, the user may adjust the playing volume by using a volume button on a remote control of the smart screen device. Currently, the smart screen device can implement device interaction. Therefore, the smart screen device may be connected to a mobile terminal of the user, and then the user may implement volume adjustment by using a touch control in a touchscreen of the mobile terminal.

In addition to how the user adjusts the playing volume, a conventional technology further provides a solution in which a distance between the user and the smart screen device is automatically detected by using the smart screen device or by using the mobile terminal connected to the smart screen device, and then the playing volume is automatically adjusted based on the distance between the user and the smart screen device, to implement volume adjustment. In this manner, an additional sensor usually needs to be added to detect the distance between the user and the smart screen device. In addition, impact of ambient noise on the playing volume is ignored in a volume adjustment process. Consequently, volume obtained through adjustment may not meet a user requirement (because the ambient noise is loud, the user still cannot clearly hear a sound of a video/audio clip played by the smart screen device).

In addition, the smart screen device can further collect an external sound (namely, ambient noise on a smart screen device side), and then the smart screen device adjusts volume of a playing sound of the smart screen device based on volume of an internal playing sound and volume of the external sound. However, in actual life, the distance between the smart screen and the user may be long, and the user still cannot hear clearly when the ambient noise around the user is loud.

To resolve a problem of poor volume obtained through adjustment according to the foregoing volume adjustment method, embodiments of this application provide a volume adjustment method and system, and an electronic device. A wearable device collects noise on a user side, and the noise on the user side is integrated, to implement volume adjustment, so that a volume adjustment solution is more robust, and a user can clearly hear a sound played by a smart screen device.

It should be noted that embodiments of this application are not only applicable to a playing volume adjustment scenario of the smart screen device, but also applicable to a playing volume adjustment scenario of a media playing device like a sound box, a radio, or a speaker. The following description is only an example rather than a limitation.

To describe in detail the volume adjustment method provided in embodiments of this application, the following describes with reference to accompanying drawings.

FIG. 1 is a schematic diagram of a scenario to which a volume adjustment method according to an embodiment of this application is applicable. As shown in FIG. 1, the scenario includes a media playing device 100 and a wearable device 200. There is a communication connection between the media playing device 100 and the wearable device 200. The wearable device 200 has a function of collecting an audio signal. For example, the audio signal includes a sound signal that is collected by the wearable device 200 and that is generated when the media playing device 100 plays content (for example, video content or audio content), and ambient noise at a location of a user.

For example, the media playing device 100 may be connected to the wearable device 200 in a wireless manner. For example, the media playing device 100 and the wearable device 200 may be connected to each other based on a communication network. The communication network may be a local area network, or may be a wide area network transferred by using a relay (relay) device. When the communication network is the local area network, for example, the communication network may be a short-range communication network like a Wi-Fi hotspot network, a ZigBee network, or a near field communication (near field communication, NFC) network. When the communication network is the wide area network, for example, the communication network may be a third-generation mobile communication technology (3rd-generation wireless telephone technology, 3G) network, a fourth-generation mobile communication technology (the 4th generation mobile communication technology, 4G) network, a fifth-generation mobile communication technology (5th generation mobile communication technology, 5G) network, a future-evolved public land mobile network (public land mobile network, PLMN), or the Internet. It may be understood that the communication network and a service scenario described in embodiments of this application are intended to describe technical solutions in embodiments of this application more clearly, and do not constitute a limitation on the technical solutions provided in embodiments of this application.

In embodiments of this application, the media playing device 100 is a device that has a playing media file (for example, an audio or video clip). For example, the media playing device 100 may be a smart screen device, a smart sound box, a smart television, a notebook computer, a desktop computer, a tablet computer, a vehicle-mounted TV, a vehicle-mounted audio device, or the like. A specific form of the media playing device 100 is not limited in embodiments of this application.

In embodiments of this application, the wearable device 200 may be a general term of wearable devices, such as glasses, gloves, watches, clothes, and shoes, that are developed by applying wearable technologies to intelligently designs of daily wear. The wearable device is a portable device that can be directly worn on a body or integrated into clothes or an accessory of a sportsman. The wearable device is not only a hardware device, but also implements a powerful function through software support, data exchange, and cloud interaction. In a broad sense, wearable intelligent devices include full-featured and large-sized devices that can implement complete or partial functions without depending on smartphones, such as smart watches or smart glasses, and devices that are dedicated to only one type of application function and need to work with other devices such as a smart screen device, for example, smart bands and smart jewelry that have functions of information interaction, sound collection, audio analysis, and instruction control.

Figure 2:
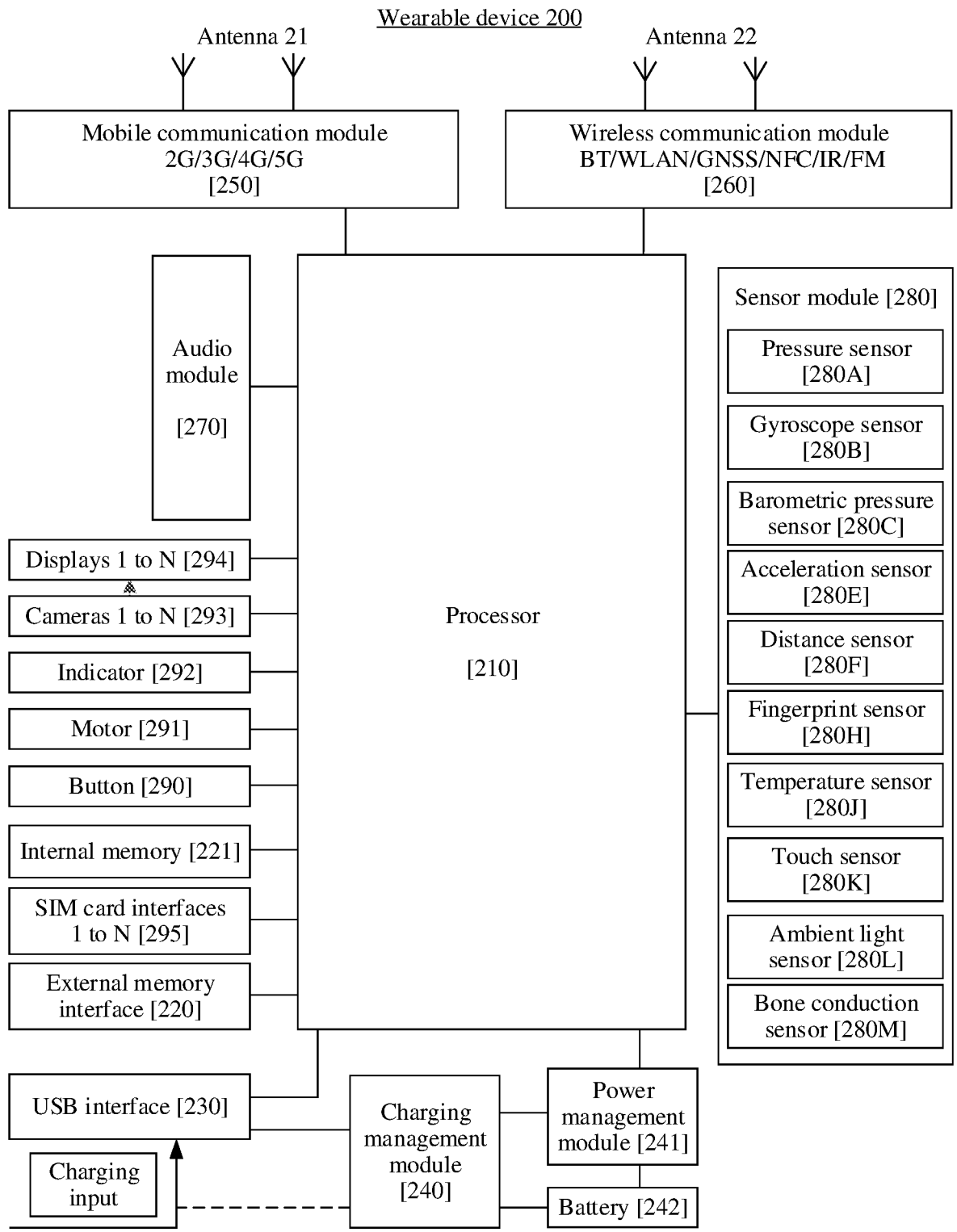
FIG. 2 is a schematic diagram of a structure of a wearable device according to an embodiment of this application.

For example, FIG. 2 is a schematic diagram of a structure of a wearable device 200. The wearable device 200 may include a processor 210, an external memory interface 220, an internal memory 221, a universal serial bus (universal serial bus, USB) interface 230, a charging management module 240, a power management module 241, a battery 242, an antenna 21, an antenna 22, a mobile communication module 250, a wireless communication module 260, an audio module 270, a sensor module 280, a button 290, a motor 291, an indicator 292, a camera 293, a display 294, and a SIM card interface 295. The sensor module 280 may include a pressure sensor 280A, a gyroscope sensor 280B, a barometric pressure sensor 280C, an acceleration sensor 280E, a range sensor 280F, a fingerprint sensor 280H, a temperature sensor 280J, a touch sensor 280K, an ambient light sensor 280L, a bone conduction sensor 280M, and the like.

It may be understood that the structure shown in this embodiment of this application does not constitute a specific limitation on the wearable device 200. In some other embodiments of this application, the wearable device 200 may include more or fewer components than those shown in the figure, or combine some components, or split some components, or have different component arrangements. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the wearable device 200. The controller may generate an operation control signal based on an instruction operation code and a time sequence signal, to complete control of instruction reading and instruction execution.

A memory may be further disposed in the processor 210, and is configured to store instructions and data. In some embodiments, the memory in the processor 210 is a cache. The memory may store instructions or data just used or cyclically used by the processor 210. If the processor 210 needs to use the instructions or the data again, the processor 210 may directly invoke the instructions or the data from the memory. This avoids repeated access and reduces waiting time of the processor 210, so that system efficiency is improved.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO)

interface, a subscriber identity module (subscriber identity module, SIM) interface, a universal serial bus (universal serial bus, USB) interface, and/or the like.

The I2C interface is a bidirectional synchronous serial bus that includes a serial data line (serial data line, SDA) and a serial clock line (derail clock line, SCL). In some embodiments, the processor 210 may include a plurality of groups of I2C buses. The processor 210 may be separately coupled to the touch sensor 280K, a charger, a flash, the camera 293, and the like through different I2C bus interfaces.

The I2S interface may be configured to perform audio communication. In some embodiments, the processor 210 may include a plurality of groups of I2S buses. The processor 210 may be coupled to the audio module 270 through the I2S bus, to implement communication between the processor 210 and the audio module 270. In some embodiments, the audio module 270 may transmit an audio signal to the wireless communication module 260 through the I2S interface, to implement a function of answering a call through a Bluetooth headset.

The PCM interface may also be used to perform audio communication, and sample, quantize, and code an analog signal. In some embodiments, the audio module 270 may be coupled to the wireless communication module 260 through a PCM bus interface.

In some embodiments, the audio module 270 may alternatively transmit an audio signal to the wireless communication module 260 through the PCM interface, to implement a function of answering a call through a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication.

In some embodiments, the UART interface is generally configured to connect the processor 210 and the wireless communication module 260. For example, the processor 210 communicates with a Bluetooth module in the wireless communication module 260 through the UART interface, to implement a Bluetooth function. In some embodiments, the audio module 270 may transmit an audio signal to the wireless communication module 260 through the UART interface, to implement a function of playing music by using a Bluetooth headset.

The MIPI interface may be configured to connect the processor 210 and a peripheral component like the display 294 or the camera 293. The MIPI interface includes a camera serial interface (camera serial interface, CSI), a display serial interface (display serial interface, DSI), and the like. In some embodiments, the processor 210 communicates with the camera 293 through the CSI interface, to implement a photographing function of the wearable device 200. The processor 210 communicates with the display 294 through the DSI interface, to implement a display function of the wearable device 200.

The GPIO interface may be configured by using software. The GPIO interface may be configured as a control signal or a data signal. In some embodiments, the GPIO interface may be configured to connect the processor 210 to the camera 293, the display 294, the wireless communication module 260, the audio module 270, the sensor module 280, or the like. The GPIO interface may alternatively be configured as an I2C interface, an I2S interface, a UART interface, an MIPI interface, or the like.

The USB interface 230 is an interface that conforms to a USB standard specification, and may be specifically a Mini USB interface, a Micro USB interface, a USB Type-C interface, or the like. The USB interface 230 may be configured to connect to a charger to charge the wearable device 200, or may be configured to transmit data between the wearable device 200 and a peripheral device (for example, the media playing device 100), or may be configured to connect to a headset to play audio by using the headset. The interface may be further configured to connect to another electronic device like an AR device.

It may be understood that, an interface connection relationship between the modules shown in this embodiment of this application is merely an example for description, and does not constitute a limitation on the structure of the wearable device 200. In some other embodiments of this application, the wearable device 200 may alternatively use an interface connection manner different from an interface connection manner in the foregoing embodiment, or a combination of a plurality of interface connection manners.

The charging management module 240 is configured to receive a charging input from a charger. The charger may be a wireless charger or a wired charger. In some embodiments of wired charging, the charging management module 240 may receive a charging input of a wired charger through the USB interface 230. In some embodiments of wireless charging, the charging management module 240 may receive a wireless charging input by using a wireless charging coil of the wearable device 200. The charging management module 240 supplies power to the electronic device by using the power management module 241 while charging the battery 242.

The power management module 241 is configured to connect to the battery 242, the charging management module 240, and the processor 210. The power management module 241 receives an input of the battery 242 and/or the charging management module 240, to supply power to the processor 210, the internal memory 221, an external memory, the display 294, the camera 293, the wireless communication module 260, and the like. The power management module 241 may be further configured to monitor parameters such as a battery capacity, a battery cycle count, and a battery health status (an electric leakage or impedance).

In some other embodiments, the power management module 241 may alternatively be disposed in the processor 210. In some other embodiments, the power management module 241 and the charging management module 240 may alternatively be disposed in a same device.

A wireless communication function of the wearable device 200 may be implemented by using the antenna 21, the antenna 22, the mobile communication module 250, the wireless communication module 260, the modem processor, the baseband processor, and the like.

The antenna 21 and the antenna 22 are configured to transmit and receive an electromagnetic wave signal. Each antenna in the wearable device 200 may be configured to cover one or more communication frequency bands. Different antennas may be further multiplexed, to improve antenna utilization. For example, the antenna 21 may be multiplexed as a diversity antenna of a wireless local area network. In some other embodiments, the antenna may be used in combination with a tuning switch.

The mobile communication module 250 may provide a wireless communication solution that is applied to the wearable device 200 and that includes 2G/3G/4G/5G. The mobile communication module 250 may include at least one filter, a switch, a power amplifier, a low noise amplifier (low noise amplifier, LNA), and the like. The mobile communication module 250 may receive an electromagnetic wave through the antenna 21, perform processing such as filtering or amplification on the received electromagnetic wave, and transmit a processed electromagnetic wave to the modem processor for demodulation. The mobile communication module 250 may further amplify a signal modulated by the modem processor, and convert an amplified signal into an electromagnetic wave for radiation through the antenna 21.

In some embodiments, at least some functional modules in the mobile communication module 250 may be disposed in the processor 210. In some embodiments, at least some functional modules in the mobile communication module 250 may be disposed in a same component as the at least some modules in the processor 210.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to a speaker, a receiver, or the like), or displays an image or a video by using the display 294. In some embodiments, the modem processor may be an independent component. In some other embodiments, the modem processor may be independent of the processor 210, and is disposed in a same component as the mobile communication module 250 or another functional module.

The wireless communication module 260 may provide a wireless communication solution that is applied to the wearable device 200 and that includes a wireless local area network (wireless local area network, WLAN) (a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 260 may be one or more components integrating at least one communication processing module. The wireless communication module 260 receives an electromagnetic wave through the antenna 22, performs frequency modulation and filtering processing on the electromagnetic wave signal, and sends a processed signal to the processor 210. The wireless communication module 260 may further receive a to-be-sent signal from the processor 210, perform frequency modulation and amplification on the signal, and convert a processed signal into an electromagnetic wave for radiation through the antenna 22.

In some embodiments, in the wearable device 200, the antenna 21 and the mobile communication module 250 are coupled, and the antenna 22 and the wireless communication module 260 are coupled, so that the wearable device 200 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division synchronous code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The wearable device 200 may implement a display function by using a GPU, a display 294, an application processor, and the like. The GPU is a microprocessor for image processing, and is connected to the display 294 and the application processor. The GPU is configured to: perform mathematical and geometric computation, and render an image. The processor 210 may include one or more GPUs that execute program instructions to generate or change display information.

The display 294 is configured to display a picture, a video, or the like. The display 294 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the wearable device 200 may include one or N displays 294, where N is an integer greater than 1.

The wearable device 200 may implement a photographing function by using the ISP, the camera 293, the video codec, the GPU, the display 294, the application processor, and the like.

The ISP is configured to process data fed back by the camera 293. For example, during photographing, a shutter is pressed, light is transferred to a camera photosensitive element through a lens, an optical signal is converted into an electrical signal, and the camera photosensitive element transmits the electrical signal to the ISP for processing, to convert the electrical signal into an image visible to a naked eye. The ISP may further perform algorithm optimization on noise, brightness, and complexion of the image. The ISP may further optimize parameters such as exposure and a color temperature of a photographing scenario. In some embodiments, the ISP may be disposed in the camera 293.

The camera 293 is configured to capture a static image or a video. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format like RGB or YUV. In some embodiments, the wearable device 200 may include one or N cameras 293, where N is a positive integer greater than 1.

The digital signal processor is configured to process a digital signal, and may process another digital signal in addition to the digital image signal. For example, when the wearable device 200 selects a frequency, the digital signal processor is configured to perform Fourier transformation on frequency energy.

The video codec is configured to compress or decompress a digital video. The wearable device 200 may support one or more video codecs. In this way, the wearable device 200 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the wearable device 200 may be implemented through the NPU, for example, image recognition, facial recognition, speech recognition, and text understanding.

In embodiments of this application, the NPU or another processor may be configured to perform operations such as face detection, face tracking, face feature extraction, and image clustering on a face image in a video stored in the wearable device 200, perform operations such as face detection and face feature extraction on a face image in a picture stored in the wearable device 200, and perform, based on facial features of the picture and a clustering result of the face image in the video, clustering on the picture stored in the wearable device 200.

The external memory interface 220 may be configured to connect to an external storage card, for example, a Micro SD card, to extend a storage capability of the wearable device 200. The external storage card communicates with the processor 210 through the external memory interface 220, to implement a data storage function. For example, files such as music and videos are stored in the external storage card.

The internal memory 221 may be configured to store computer executable program code, where the executable program code includes instructions. The processor 210 executes various function applications and data processing of the wearable device 200 by running the instructions stored in the internal memory 221. The internal memory 221 may include a program storage area and a data storage area. The program storage area may store an operating system, an application (for example, a volume adjustment application) required by at least one function, and the like. The data storage region may store data (such as audio data and a phone book) created when the wearable device 200 is used, and the like.

In addition, the internal memory 221 may include a high-speed random access memory, and may further include a non-volatile memory, for example, at least one magnetic disk storage device, a flash memory device, or a universal flash storage (universal flash storage, UFS).

The wearable device 200 may implement an audio function like music playing, audio collecting, or recording by using the audio module 270, the speaker, the receiver, the microphone, a headset jack, the application processor, and the like.

The audio module 270 is configured to convert digital audio information into an analog audio signal for output, and is also configured to convert an analog audio input into a digital audio signal. The audio module 270 may be further configured to code and decode an audio signal. In some embodiments, the audio module 270 may be disposed in the processor 210, or some functional modules in the audio module 270 are disposed in the processor 210.

The pressure sensor 280A is configured to sense a pressure signal, and may convert the pressure signal into an electrical signal. In some embodiments, the pressure sensor 280A may be disposed on the display 294. There are many types of pressure sensors 280A, such as a resistive pressure sensor, an inductive pressure sensor, and a capacitive pressure sensor. The capacitive pressure sensor may include at least two parallel plates made of conductive materials. Capacitance between electrodes changes when a force is applied to the pressure sensor 280A. The wearable device 200 determines pressure intensity based on the change in the capacitance. When a touch operation is performed on the display 294, the wearable device 200 detects intensity of the touch operation through the pressure sensor 280A. The wearable device 200 may also calculate a touch location based on a detection signal of the pressure sensor 280A.

In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 280B may be configured to determine a moving posture of the wearable device 200. In some embodiments, an angular velocity of the wearable device 200 around three axes (namely, x, y, and z axes) may be determined by using the gyroscope sensor 280B. The gyroscope sensor 280B may be used in a navigation scenario and a somatic game scenario.

The barometric pressure sensor 280C is configured to measure atmospheric pressure. In some embodiments, the wearable device 200 calculates an altitude through the barometric pressure measured by the barometric pressure sensor 280C, to assist in positioning and navigation.

The acceleration sensor 280E may detect accelerations in various directions (usually on three axes) of the wearable device 200, and when the wearable device 200 is static, a magnitude and a direction of gravity may be detected. The acceleration sensor may further be configured to identify a posture of the wearable device, and is applied to an application like a pedometer.

The distance sensor 280F is configured to measure a distance. The wearable device 200 may measure the distance in an infrared manner or a laser manner. In some embodiments, the wearable device 200 may measure a distance from the media playing device 100 by using the distance sensor 280F.

The ambient light sensor 280L is configured to sense ambient light brightness. The wearable device 200 may adaptively adjust brightness of the display 294 based on the sensed ambient light brightness. The ambient light sensor 280L may also be configured to automatically adjust white balance during photographing.

The fingerprint sensor 280H is configured to collect a fingerprint. The wearable device 200 may use a feature of the collected fingerprint to implement fingerprint-based unlocking, application lock access, fingerprint-based photographing, fingerprint-based call answering, and the like.

The temperature sensor 280J is configured to detect a temperature. In some embodiments, the wearable device 200 executes a temperature processing policy based on the temperature detected by the temperature sensor 280J. For example, when the temperature reported by the temperature sensor 280J exceeds a threshold, the wearable device 200 lowers performance of a processor nearby the temperature sensor 280J, to reduce power consumption for thermal protection. In some other embodiments, when the temperature is less than another threshold, the wearable device 200 heats the battery 242 to prevent the wearable device 200 from being shut down abnormally due to a low temperature. In some other embodiments, when the temperature is lower than still another threshold, the wearable device 200 boosts an output voltage of the battery 242 to avoid abnormal shutdown caused by a low temperature.

The touch sensor 280K is also referred to as a "touch panel". The touch sensor 280K may be disposed in the display 294, and the touch sensor 280K and the display 294 form a touchscreen, which is also referred to as a "touch control screen". The touch sensor 280K is configured to detect a touch operation performed on or near the touch sensor 280K. The touch sensor may transfer the detected touch operation to the application processor to determine a type of a touch event. Visual output related to the touch operation may be provided by using the display 294. In some other embodiments, the touch sensor 280K may alternatively be disposed on a surface of the wearable device 200 at a location different from that of the display 294.

The bone conduction sensor 280M may obtain a vibration signal. In some embodiments, the bone conduction sensor 280M may obtain a vibration signal of a vibration bone of a human vocal-cord part. The bone conduction sensor 280M may also contact a pulse of a human body and receive a blood pressure pulse signal.

In some embodiments, the bone conduction sensor 280M may alternatively be disposed in the headset, to combine into a bone conduction headset. The audio module 270 may parse out a voice signal based on the vibration signal of the vibration bone of the vocal part that is obtained by the bone conduction sensor 280M, to implement a voice function. The application processor may parse heart rate information based on the blood pressure pulse signal obtained by the bone conduction sensor 280M, to implement a heart rate detection function.

The button 290 includes a power button, a volume button, and the like. The button 290 may be a mechanical button, or may be a touch button. The wearable device 200 may receive an input of the button, and generate a button signal input related to a user setting and function control of the wearable device 200.

The motor 291 may generate a vibration prompt. The motor 291 may be configured to provide an incoming call vibration prompt and a touch vibration feedback. For example, touch operations performed on different applications (for example, photographing and audio playing) may correspond to different vibration feedback effects. The motor 291 may also generate different vibration feedback effects for touch operations performed on different areas of the display 294. Different application scenarios (for example, a time reminder, information receiving, an alarm clock, and a game) may also correspond to different vibration feedback effects. A touch vibration feedback effect may be further customized.

The indicator 292 may be an indicator light, may be configured to indicate a charging status and a battery level change, and may also be configured to indicate a message, a missed call, a notification, and the like.

The SIM card interface 295 is configured to connect to a SIM card. The SIM card may be inserted into the SIM card interface 295 or removed from the SIM card interface 295, to implement contact with or separation from the wearable device 200. The wearable device 200 may support one or N SIM card interfaces, where N is a positive integer greater than 1. The SIM card interface 295 may support a nano-SIM card, a micro-SIM card, a SIM card, and the like. A plurality of cards may be simultaneously inserted into a same SIM card interface 295. The plurality of cards may be of a same type or different types. The SIM card interface 295 may also be compatible with different types of SIM cards. The SIM card interface 295 may also be compatible with the external storage card. The wearable device 200 interacts with a network through the SIM card, to implement functions such as calling and data communication. In some embodiments, the wearable device 200 uses an eSIM, namely, an embedded SIM card. The eSIM card may be embedded in the wearable device 200, and cannot be separated from the wearable device 200.

The following describes a volume adjustment method provided in an embodiment of this application by using an example in which the media playing device 100 is a smart screen device and the wearable device 200 is a smart band.

Figure 3:
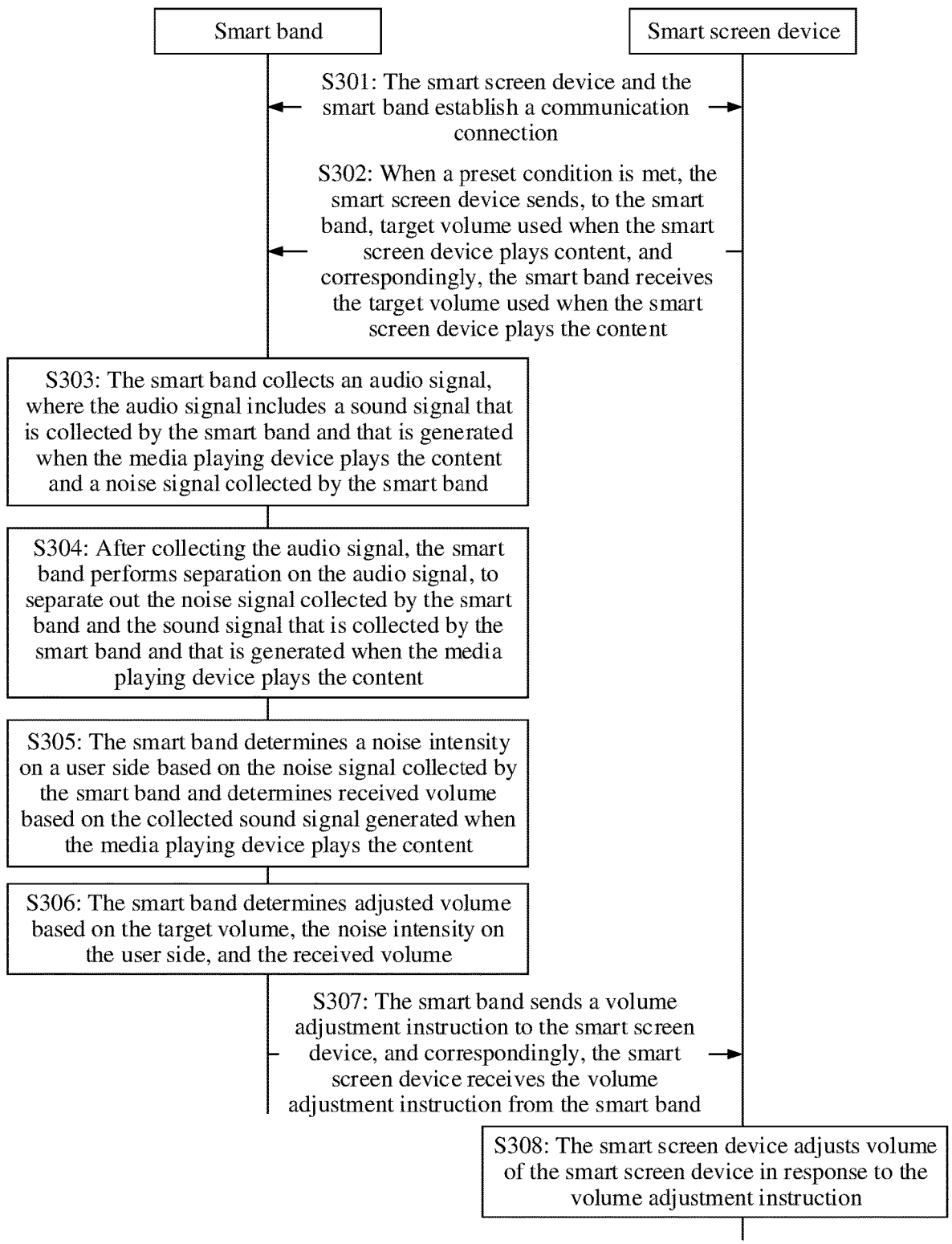
FIG. 3 is a schematic flowchart of a volume adjustment method according to an embodiment of this application.

FIG. 3 is a schematic flowchart of a volume adjustment method according to an embodiment of this application. The method includes the following steps.

S301: The smart screen device and the smart band establish a communication connection.

For how to establish the communication connection between the smart screen device and the smart band, refer to the descriptions in the foregoing embodiment. Details are not described herein again.

It should be noted that, when the smart band and the smart screen device already have a communication connection, establishing the communication connection may be omitted.

S302: When a preset condition is met, the smart screen device sends, to the smart band, target volume used when the smart screen device plays content, and correspondingly, the smart band receives the target volume used when the smart screen device plays the content.

For example, the preset condition may include that a sending periodicity is reached. In other words, the smart screen device may periodically send, to the smart band based on a preset periodicity (5 seconds or 10 minutes), the target volume used when the smart screen device plays the content.

For another example, the preset condition may include: Volume used when the smart screen device plays the content changes. For example, if the target volume used when the smart screen device plays the content at a current moment is V1, and the target volume used when the smart screen device plays the content at a next moment is V2, the smart screen device may send, to the smart band, the target volume (namely, V2) used when the smart screen device plays the content. When the target volume used when the smart screen device plays the content changes, the smart screen device then sends, to the smart band, the target volume used when the smart screen device plays the content. This can reduce signaling overheads in comparison with the foregoing periodic sending of the target volume.

For another example, the preset condition may include that the smart screen device detects a power-on instruction of the smart screen device.

In an embodiment of this application, when there is the communication connection between the smart band and the smart screen device, the smart band may also send a request instruction to the smart screen device. The request instruction is used to request the smart screen device to send, to the smart band, target volume of content currently played by the smart screen device. Correspondingly, after receiving the request instruction, the smart screen device may send, to the smart band in response to the request instruction, the target volume of the content currently played by the smart screen device. To be specific, the preset condition may also include triggering based on the smart band.

For example, as shown in FIG. 1, Xiao Ming sits on a sofa to watch a video played on the smart screen device, and Xiao Ming wears the smart band. If Xiao Ming finds that volume of the video currently played on the smart screen device is low, Xiao Ming may tap a request control displayed on the smart band. If the smart band detects that the request control is triggered, the smart band sends the request instruction to the smart screen device.

Volume of the smart screen device is adjusted through linkage between the smart screen device and the smart band, to improve user experience. However, in an actual process, even if there is the communication connection between the smart screen device and the smart band, it does not mean that a user wants to adjust the volume of the smart screen device by using the smart band. Based on this, in this embodiment of this application, the smart screen device may have a control. When the control is in an enabled state, it indicates that the smart screen device authorizes linkage with the smart band to adjust the volume of the smart screen device. When the control is in a disabled state, it indicates that the smart screen device forbids linkage with the smart band to adjust the volume of the smart screen device. Based on this, in this embodiment of this application, when the control of the smart screen device is in the enabled state, the smart screen device sends, to the smart band when the preset condition is met, the target volume used when the smart screen device plays the content.

Certainly, the smart screen device may alternatively authorize, by default, linkage with the smart band to adjust the volume of the smart screen device.

S303: The smart band collects an audio signal, where the audio signal includes a sound signal that is collected by the smart band and that is generated when the media playing device plays the content and a noise signal collected by the smart band.

The smart band in this embodiment of this application has an audio collection function. In this way, the smart band can collect various audio signals in a specific surrounding range.

For example, with reference to FIG. 1, the user sits on a sofa in a living room. In this case, the smart screen device in the living room is playing a video The Wandering Earth at the target volume. A sound generated when the smart screen device plays the video The Wandering Earth is propagated to the user through the air. Because the volume is weakened in a sound propagation process, the longer a distance between the user and the smart screen device, the more the volume is weakened. Alternatively, when there is an obstacle (for example, a wall) between the user and the smart screen device, a sound arriving at a user side is also weakened. In this way, for the smart band worn by the user, the smart band having the audio collection function can collect a sound around the user. For the smart band, an audio signal collected by the smart band not only includes a sound obtained after the sound generated when the smart screen device plays the video The Wandering Earth is propagated to the user side through the air, but also includes some noise, for example, ambient noise (a sound of a whistle outside a window, or a sound of another speech inside or outside a room), and a sound generated by another indoor or outdoor device.

In an embodiment of this application, to save power of the smart band, the smart band may have a control component.

When the control component is enabled, the smart band may determine to enable the audio collection function, to collect the audio signal. When the control component is not enabled, the smart band disables the audio collection function. In addition, when the control component is enabled, the smart band may also send the request instruction to the smart screen device.

S304: After collecting the audio signal, the smart band performs separation on the audio signal, to separate out the noise signal collected by the smart band and the sound signal that is collected by the smart band and that is generated when the media playing device plays the content.

For example, the smart band may perform separation on the audio signal according to a blind source separation algorithm. The blind source separation algorithm is a currently commonly used signal separation algorithm. In this embodiment of this application, an existing blind source separation algorithm (for example, an independent component analysis method) may be used to separate out, from the audio signal, the noise signal collected by the smart band and the sound signal that is collected by the smart band and that is generated when the media playing device plays the content.

S305: The smart band determines a noise intensity on the user side based on the noise signal collected by the smart band, and determines received volume based on the collected sound signal generated when the media playing device plays the content.

S306: The smart band determines adjusted volume based on the target volume, the noise intensity on the user side, and the received volume.

The smart band may determine a volume weakening degree based on the received volume and the target volume, and then determine an adjustment base based on the volume weakening degree. To be specific, when the volume weakening degree is less than a preset weakening threshold, the smart band determines the adjustment base as 0. Alternatively, when the volume weakening degree is greater than or equal to a preset weakening threshold, the smart band determines the adjustment base as an absolute value of a difference between the received volume and the target volume.

The smart band may determine an enhancement value based on the noise intensity on the user side. After determining the adjustment base and the enhancement value, the smart band can determine the adjusted volume based on the adjustment base and the enhancement value.

In an embodiment of this application, S306 may be implemented in the following manner: The smart band may compare the received volume with the target volume, to determine the adjustment base. The smart band determines the adjusted volume based on the adjustment base and the noise intensity on the user side.

It should be noted that the sound generated when the smart screen device plays the content is propagated to the user through the air. Because the volume is weakened in the sound propagation process, volume (namely, the received volume) arriving at the user side is less than the target volume. The greater the distance between the user and the smart screen device, the more the volume is weakened. After determining the received volume, the smart band may determine, based on the difference between the received volume and the target volume, a case in which the volume is weakened. If the volume weakening degree is less than the preset weakening threshold, it indicates that the distance between the user and the smart screen device is small. Therefore, the smart band may determine the adjusted volume based on only ambient noise on the user side. Only when volume of the ambient noise exceeds a preset noise threshold, the playing volume of the smart screen device is increased (because the distance between the user and the smart screen device is small, only impact of the ambient noise needs to be considered to determine whether the volume needs to be increased). When the volume weakening degree is greater than or equal to the preset weakening threshold, the playing volume of the smart screen device may be increased (specific volume to be adjusted may be determined based on the received volume, the target volume, and a magnitude of noise on the user side), so that the user can clearly hear the playing volume of the smart screen device. The preset weakening threshold may be determined based on an actual scenario. This is not limited in this application. The preset noise threshold may alternatively be determined based on an actual situation. This is not limited in this application.

Herein, when the volume weakening degree is less than the preset weakening threshold, the adjustment base may be determined as 0. When the volume weakening degree is greater than or equal to the preset weakening threshold, the adjustment base may be determined as the absolute value of the difference between the received volume and the target volume.

Specifically, the smart band may further determine a corresponding noise intensity level based on the noise intensity on the user side, then determine, based on the noise intensity level, an enhancement value corresponding to the level, and finally determine the adjusted volume based on the enhancement value and the adjustment base.

For example, it is assumed that the received volume is A, and the target volume is B. The smart band may determine, based on the received volume A and the target volume B, a volume weakening degree S.

In an embodiment of this application, the volume weakening degree S may be represented as $S=(B-A)/B \times 100\%$.

When the volume weakening degree S is greater than or equal to the preset weakening threshold, the smart band may determine an adjustment base C as an absolute value of a difference between the target volume B and the received volume A, that is, $C=|B-A|$.

After the smart band determines the corresponding noise intensity level based on the noise signal on the user side, the smart band may determine an enhancement value D based on the noise intensity level.

The smart band can determine an adjusted volume F by adding the enhancement value D to the adjustment base C, that is, $F=C+D$.

It may be understood that, when the volume weakening degree S is less than the preset weakening threshold, the smart band may determine the adjustment base C as 0 decibels.

It may be understood that, because the noise signal on the user side exists all the time, the enhancement value D cannot be a negative number. When a noise value of the noise signal on the user side is less than the preset noise threshold, the corresponding enhancement value may be 0 decibels. When the adjustment base is 0 decibels and the enhancement value is 0 decibels, the adjusted volume is also 0 decibels. In this case, the smart band may not send a volume adjustment instruction to the smart screen device.

In this embodiment of this application, an association table between the enhancement value and the noise intensity level may be preset, and the enhancement value corresponding to the noise intensity level can be determined by looking up the table. Specifically, the noise intensity on the user side is classified into several intensity levels, and then each intensity level corresponds to an enhancement value. For example, the noise intensity on the user side is classified into four intensity levels: N1, N2, N3, and N4. An enhancement value corresponding to the intensity level N1 is D1, an enhancement value corresponding to the intensity level N2 is D2, an enhancement value corresponding to the intensity level N3 is D3, and an enhancement value corresponding to the intensity level N4 is D4. It should be noted that a level classification standard of the noise intensity on the user side may be determined based on an actual scenario, and a specific value of an enhancement value corresponding to each intensity level may be determined based on an actual situation. This is not limited in this application.

It should be noted that, the smart band may further directly determine, based on a value of the noise intensity on the user side, the enhancement value corresponding to the value. For example, this is implemented by using a trained neural network model, that is, after the noise intensity on the user side is input into the trained neural network model for processing, the corresponding enhancement value is output. It should be further noted that the neural network model may be implemented by using an existing convolutional neural network module. This is not limited in this application. The existing neural network model may be used for training, and a neural network construction and training process is not described in detail in this application.

S307: The smart band sends the volume adjustment instruction to the smart screen device, and correspondingly, the smart screen device receives the volume adjustment instruction from the smart band.

The volume adjustment instruction includes the adjusted volume, and the volume adjustment instruction is used to trigger the smart screen device to adjust the volume of the smart screen device.

In this embodiment of this application, after determining the adjusted volume, the smart band may generate a corresponding volume adjustment instruction based on the adjusted volume. After generating the volume adjustment instruction, the smart band sends the volume adjustment instruction to the smart screen device, so that the smart screen device adjusts the volume.

S308: The smart screen device adjusts the volume of the smart screen device in response to the volume adjustment instruction.

For example, if the volume adjustment instruction instructs to increase the volume of the smart screen device, the smart screen device increases the volume of the smart screen device. For example, the smart screen device adds the adjusted volume to the target volume of the smart screen device, to obtain a volume value A, and uses the volume value A as the volume used when the content is played. If the volume adjustment instruction instructs to decrease the volume of the smart screen device, the smart screen device decreases the volume of the smart screen device. For example, the smart screen device subtracts the adjusted volume from the target volume of the smart screen device, to obtain a volume value B, and uses the volume value B as the volume used when the content is played.

In actual application, the smart band may further determine, based on whether the user is making a call, whether the playing volume of the smart screen device needs to be adjusted. To be specific, when detecting that the user is making a call, the smart band does not adjust the playing volume of the smart screen device. When detecting that the user is not making a call, the smart band may determine the adjusted volume based on the target volume, the received volume, and the magnitude of noise on the user side.

In addition, the smart band may further detect the distance between the user and the smart screen device in real time. When detecting that the distance between the user and the smart screen device becomes smaller, the smart screen device may determine whether the playing volume of the smart screen device is excessively high. If the playing volume of the smart screen device is excessively high, a volume adjustment instruction for reducing the playing volume of the smart screen device is generated to control the playing volume of the smart screen device. The adjusted volume may be determined based on the distance between the user and the smart screen device and current playing volume of the smart screen device. This is not specifically limited.

In a possible embodiment of this application, before the smart band sends the volume adjustment instruction to the smart screen device, the smart band may further prompt, by using prompt information, whether to adjust the volume of the smart screen device. Then, the smart band determines, based on a feedback message of the user for the prompt information, whether to send the volume adjustment instruction to the smart screen device.

Figure 4:
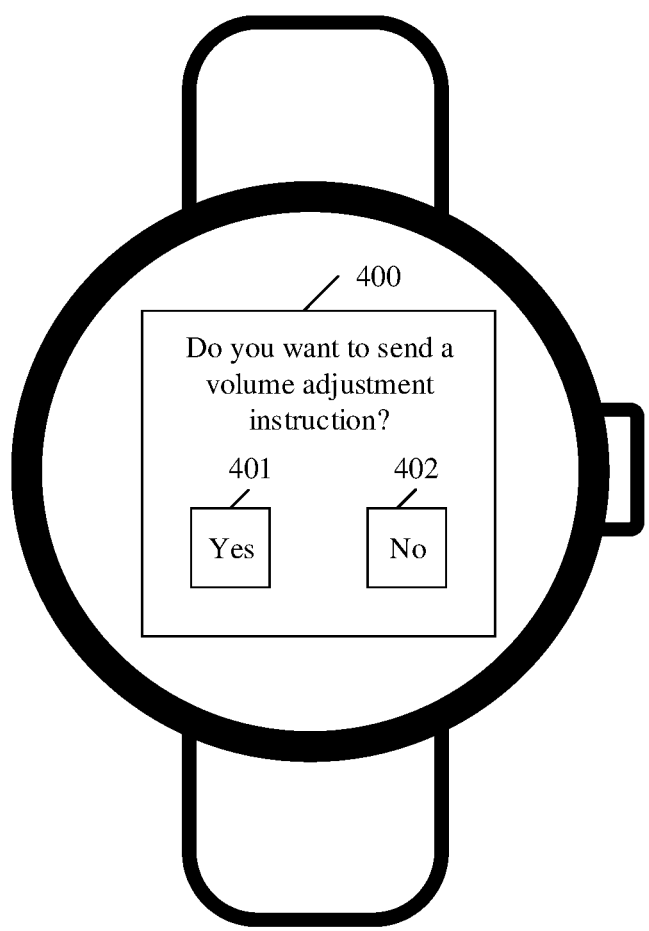
FIG. 4 is a schematic diagram of a display interface of a smart band according to an embodiment of this application.

As shown in FIG. 4, after the smart band obtains the adjusted volume through calculation, the smart band displays a prompt box 400 on a display of the smart band. The prompt box 400 is used to prompt whether to adjust the volume of the smart screen device. If the smart band detects that a control 401 "Yes" is triggered, the smart band determines to adjust the volume of the smart screen device. Therefore, the smart band sends the volume adjustment instruction to the smart screen device. If the smart band detects that a control 402 "No" is triggered, the smart band determines not to adjust the volume of the smart screen device. Therefore, the smart band sends the volume adjustment instruction to the smart screen device. For example, if the user determines that the smart screen device plays media content at current volume (namely, the target volume), and the user can clearly hear a sound of the media content played by the smart screen device, or the user is currently making a call, the user may trigger the control 402 "No". If the user determines that the sound of the media content played by the smart screen device cannot be clearly heard currently, the control 401 "Yes" may be triggered. According to the method, whether to adjust the volume of the smart screen device can be implemented based on a user requirement. This improves user experience.

It should be noted that, if the smart band does not detect, within specified time (for example, 5 seconds or 10 seconds), that the control 402 is "No" or the control 401 is "Yes" is triggered, the smart band sends the volume adjustment instruction by default, or does not send the volume adjustment instruction by default.

In an embodiment of this application, if the smart band is further connected to a mobile phone of the user, and the smart band detects that the user is currently making a call, to avoid affecting a listening effect of the user during the call, the smart band may send a volume adjustment instruction to the smart screen device, where the volume adjustment instruction instructs the smart screen device to decrease the playing volume of the smart screen device. In an example, the volume adjustment instruction may carry a first volume value, and the first volume value may be a system default value. In this way, after receiving the first volume value, the smart screen device may decrease current volume of the smart screen device by the first volume value.

In addition, if the smart band detects that the user ends calling, the smart band may send a volume adjustment instruction to the smart screen device, where the volume adjustment instruction instructs the smart screen device to increase the playing volume of the smart screen device. In an example, the volume adjustment instruction instructs the smart screen device to adjust the playing volume of the smart screen device to a second volume value. The second volume value is a preferred volume value set by the user on the smart screen device, or the second volume value is a preferred volume value set by the user on the smart band, or the second volume value is the volume value used when the smart screen device plays the content before the user makes a call.

It should be noted that, if the smart band detects that the user is currently making a call, before sending the volume adjustment instruction to the smart television, the smart band may alternatively prompt the user in the manner shown in FIG. 4. Details are not described herein again.

In an embodiment of this application, after adjusting the playing volume, the smart screen device may actively send adjusted playing volume as the target volume to the smart band.

In an embodiment of this application, the smart band sends an instruction to the smart screen device within specific time after sending the volume adjustment instruction, where the instruction is used to request the smart screen device to send updated target volume to the smart band.

It can be learned from the foregoing that, in the volume adjustment method provided in this embodiment of this application, the volume adjustment instruction is finally determined based on the ambient noise on the user side, the target volume, and the volume received by the user side, so that volume of the audio signal played by the smart screen device can be effectively adjusted to a degree at which the user can clearly hear. In this way, the volume adjustment solution is more robust, and the user can clearly hear the sound played by the smart screen device, to resolve a problem of a poor volume adjustment effect in the current volume adjustment method.

In addition, a processor of the wearable device like the smart band is usually not configured highly, and consequently, a computing capability or a processing capability of the wearable device like the smart band is not strong. It is difficult to deploy functions in the wearable device like the smart band, such as the foregoing signal separation (separating out, based on the collected sound signal, the ambient noise on the user side and the sound signal that is played by the smart screen device and that is received by the smart band), and volume adjustment (determining the adjustment base based on the target volume and volume (received volume) of the sound signal that is played by the smart screen device and that is received by the smart band, and then determining a final adjusted volume in consideration of the ambient noise on the user side based on the adjustment base). Therefore, an embodiment of this application further provides another volume adjustment method. The several functions are deployed by introducing a device (for example, a mobile phone) with a stronger computing capability or processing capability. Steps of signal separation and volume adjustment are performed by using the mobile phone, so that volume adjustment effectiveness can also be improved. In this case, a problem that the functions cannot be deployed due to a weak computing capability or processing capability of the wearable device like a band can be resolved. The following describes in detail the another volume adjustment method provided in embodiments of this application with reference to the accompanying drawings.

Figure 5:
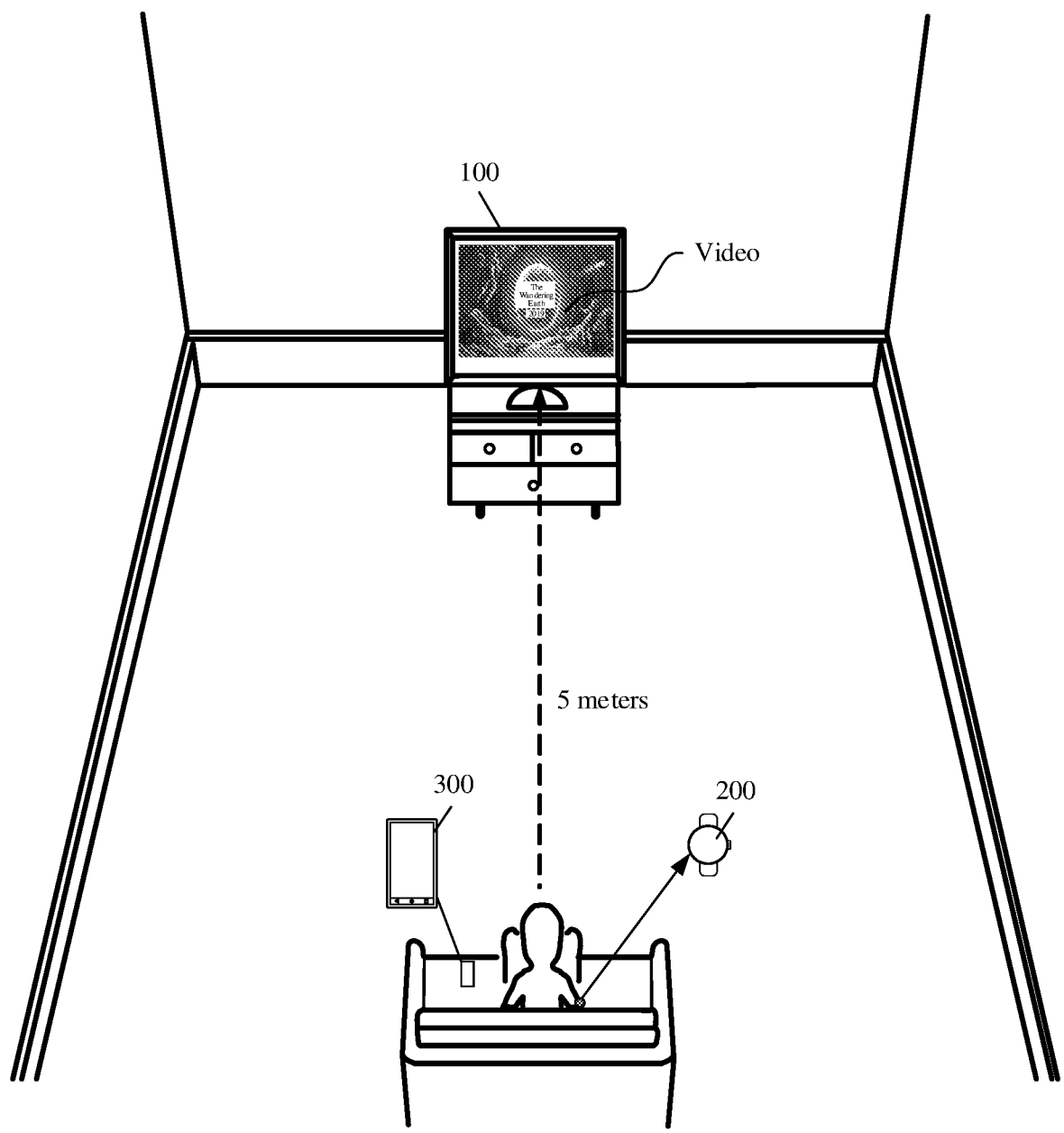
FIG. 5 is a schematic diagram of another scenario according to an embodiment of this application.

FIG. 5 is a schematic diagram of another scenario to which a volume adjustment method according to an embodiment of this application is applicable. As shown in FIG. 5, a difference between the scenario and the scenario shown in FIG. 1 lies in that the scenario further includes an electronic device 300. There is a communication connection between the electronic device 300 and the wearable device 200.

For how to establish the communication connection between the wearable device 200 and the electronic device 300, refer to content in the foregoing embodiment. Details are not described herein again.

In another scenario of this application, there may also be a communication connection between the media playing device 100 and the electronic device 300.

In embodiments of this application, the electronic device 300 may be an electronic device of which hardware configuration is higher than that of the wearable device, for example, a mobile phone, a notebook computer, a desktop computer, or a tablet computer. A specific form of the electronic device 300 is not excessively limited in embodiments of this application.

The following describes a volume adjustment method provided in embodiments of this application by using an example in which the media playing device 100 is a smart screen device, the wearable device 200 is a smart band, and the electronic device 300 is a mobile phone.

Figure 6A:
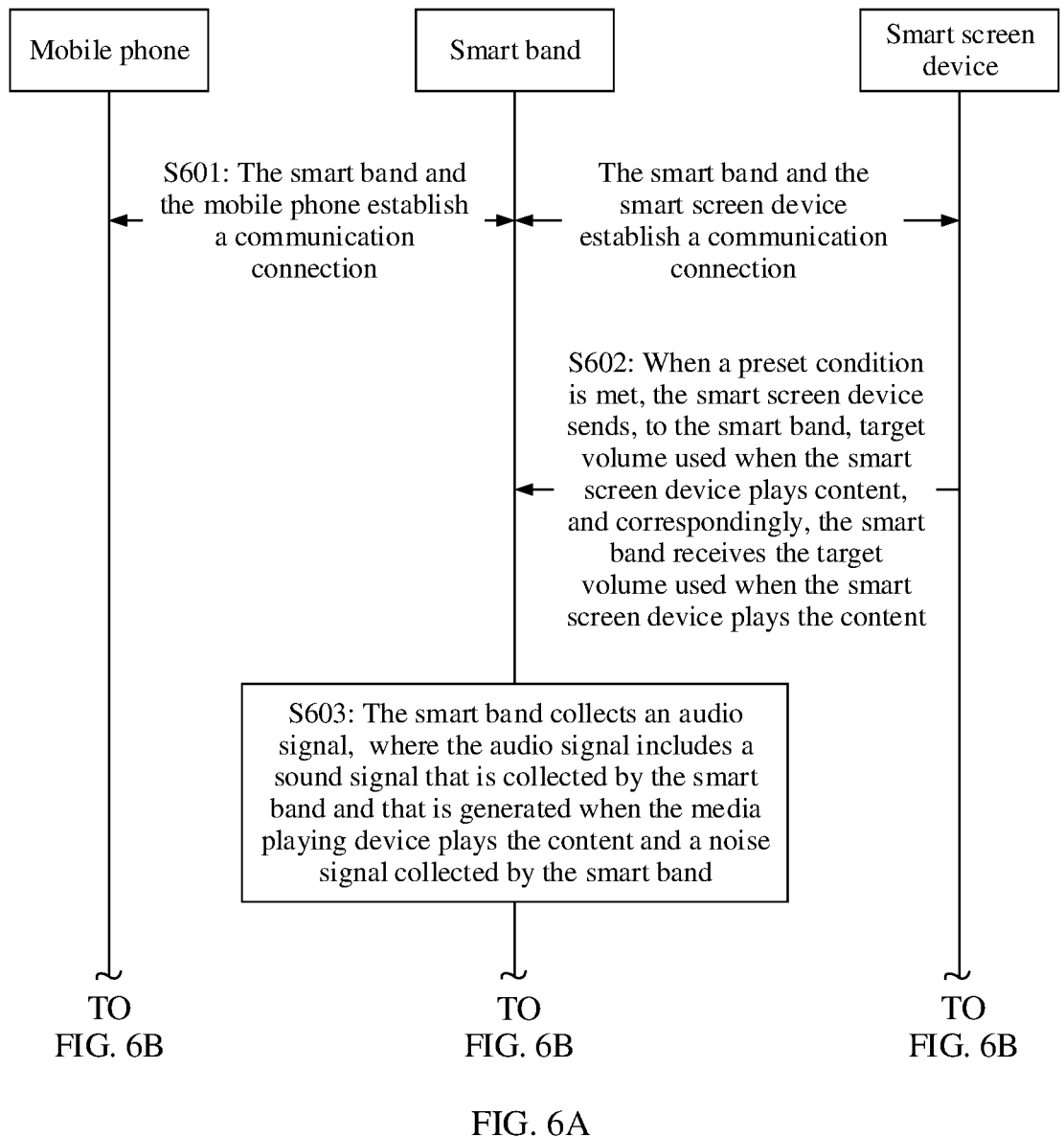
Figure 6B:
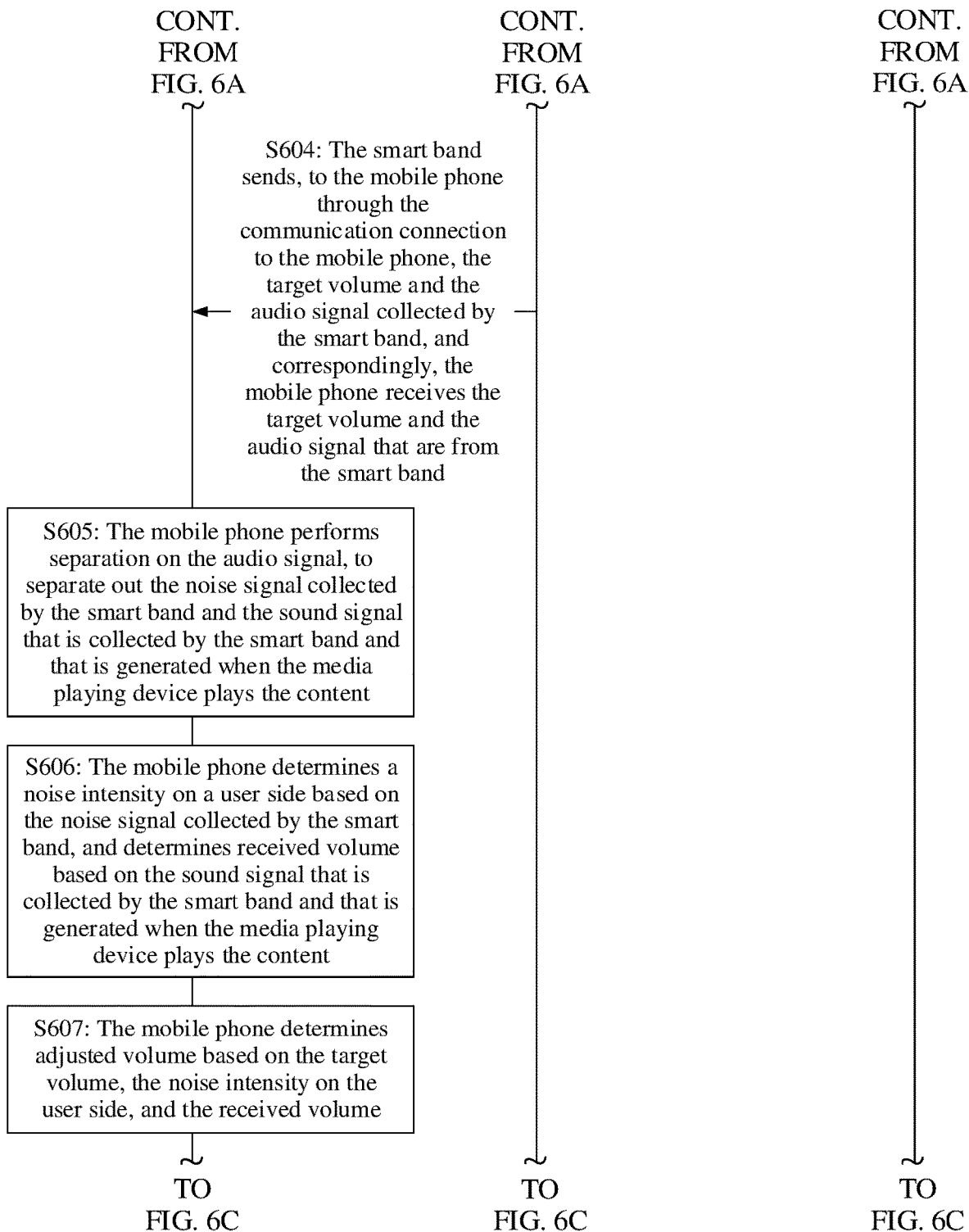

FIG. 6A to FIG. 6C are a schematic flowchart of another volume adjustment method according to an embodiment of this application. The method includes the following steps.

S601: The smart band and the mobile phone establish a communication connection, and the smart band and the smart screen device establish a communication connection.

For how to establish the communication connection between the smart band and the mobile phone and the communication connection between the smart band and the smart screen device, refer to the descriptions in the foregoing embodiment. Details are not described herein again.

S602 and S603 are the same as S302 and S303. Details are not described herein again.

S604: The smart band sends, to the mobile phone through the communication connection to the mobile phone, target volume and an audio signal collected by the smart band, and correspondingly, the mobile phone receives the target volume and the audio signal that are from the smart band.

S605: The mobile phone performs separation on the audio signal, to separate out a noise signal collected by the smart band and a sound signal that is collected by the smart band and that is generated when a media playing device plays content.

For implementation of S605, refer to the descriptions of S305. Details are not described herein again.

S606: The mobile phone determines a noise intensity on a user side based on the noise signal collected by the smart band, and determines received volume based on the sound signal that is collected by the smart band and that is generated when the media playing device plays the content.

S607: The mobile phone determines adjusted volume based on the target volume, the noise intensity on the user side, and the received volume.

For implementation of S607, refer to the description in S306. Details are not described herein again. Specifically, an execution body during specific implementation of determining, by the smart band, the adjusted volume in S306 may be updated from the smart band to the mobile phone.

S608: The mobile phone sends the adjusted volume to the smart band through the communication connection to the smart band, and correspondingly, the smart band may receive the adjusted volume from the mobile phone through the communication connection to the mobile phone.

S609: The smart band sends a volume adjustment instruction to the smart screen device. The volume adjustment instruction includes the adjusted volume, and the volume adjustment instruction is used to trigger the smart screen device to adjust volume of the smart screen device.

For implementation of S609, refer to the descriptions in S307. Details are not described herein again.

Descriptions of S610 are the same as the descriptions of S308. Details are not described herein again.

It should be noted that, when there is the communication connection between the mobile phone and the smart screen device, S608 and S609 may be replaced with the following steps: The mobile phone sends the volume adjustment instruction to the smart screen device. The volume adjustment instruction includes the adjusted volume, and the volume adjustment instruction is used to trigger the smart screen device to adjust the volume of the smart screen device.

It can be learned from the foregoing that, in the volume adjustment method provided in embodiments of this application, the device with the stronger computing capability or processing capability is used to perform signal separation and determine the adjusted volume, so that a volume adjustment effect in the foregoing embodiment can be implemented, and the problem that a computing capability or a processing capability of an intelligent wearable device like a band is weak can be resolved.

Based on a same inventive concept, in an implementation of the foregoing method, embodiments of this application provide an electronic device. The electronic device embodiment corresponds to the foregoing method embodiment. For ease of reading, details in the foregoing method embodiment are not described one by one in this embodiment. However, it should be clarified that the apparatus in this embodiment can correspondingly implement all content in the foregoing method embodiment.

It should be noted that content such as information exchange between the foregoing apparatuses/units and the execution processes thereof is based on a same concept as the method embodiments of this application. For specific functions and technical effects of the content, refer to the method embodiments. Details are not described herein again.

A person skilled in the art may clearly understand that, for the purpose of convenient and brief description, division into the foregoing functional units or modules is merely used as an example for description. In an actual application, the foregoing functions may be allocated to different functional units or modules for implementation based on a requirement. To be specific, an inner structure of the apparatus is divided into different functional units or modules to implement all or some of the functions described above. Functional units and modules in embodiments may be integrated into one processing unit, each of the units may exist alone physically, or two or more units may be integrated into one unit. The integrated unit may be implemented in a form of hardware, or may be implemented in a form of a software functional unit. In addition, specific names of the functional units and modules are merely for ease of distinguishing between the functional units and modules, but are not intended to limit the protection scope of this application. For a specific working process of the units or modules in the foregoing system, refer to a corresponding process in the method embodiments. Details are not described herein again.

An embodiment of this application further provides a computer-readable storage medium. The computer-readable storage medium stores a computer program. When the computer program is executed by a processor, the steps in the foregoing method embodiments can be implemented.

An embodiment of this application provides a computer program product. When the computer program product runs on a mobile terminal, the mobile terminal is enabled to implement the steps in the foregoing method embodiments when executing the computer program product.

When the integrated unit is implemented in the form of the software functional unit and sold or used as an independent product, the integrated unit may be stored in a computer-readable storage medium. Based on such an understanding, all or some of the procedures of the method in embodiments of this application may be implemented by a program instructing related hardware. The computer program may be stored in a computer-readable storage medium. When the computer program is executed by the processor, steps of the foregoing method embodiments may be implemented. The computer program includes computer program code. The computer program code may be in a source code form, an object code form, an executable file form, some intermediate forms, or the like. The computer-readable medium may include at least any entity or apparatus that can carry the computer program code to an apparatus/electronic device, a recording medium, a computer memory, a read-only memory (ROM, Read-Only Memory), a random access memory (RAM, Random Access Memory), an electrical carrier signal, a telecommunication signal, and a software distribution medium, for example, a USB flash drive, a removable hard disk, a magnetic disk, or an optical disk. In some jurisdictions, the computer-readable medium cannot be an electrical carrier signal or a telecommunication signal according to legislation and patent practices.

In the foregoing embodiments, descriptions of embodiments have respective focuses. For a part that is not described in detail in an embodiment, refer to related descriptions in another embodiment.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In embodiments provided in this application, it should be understood that the disclosed apparatus/electronic device and method may be implemented in other manners. For example, the described apparatus/electronic device embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, applied to a first electronic device, wherein the method comprises:
receiving a target volume for when a media playing device plays content;
obtaining an audio signal, wherein the audio signal comprises a first signal and a second signal, the first signal is a sound signal that is collected by a wearable device worn by a user and that is generated when the media playing device plays the content, and the second signal is a noise signal on a user side that is collected by the wearable device;
determining adjusted volume based on the audio signal and the target volume, wherein determining the adjusted volume based on the target volume, the first signal, and the second signal comprises:
determining received volume based on the first signal;
determining an adjustment base based on the received volume and the target volume;
determining an enhancement value based on the noise signal on the user side; and
determining the adjusted volume based on the adjustment base and the enhancement value; and
sending the adjusted volume to a target device through a communication connection to the target device, wherein the target volume for when the media playing device plays the content is updated based on the adjusted volume.

2. The method according to claim 1, wherein when the first electronic device is the wearable device, the target device is the media playing device.

3. The method according to claim 2, wherein the audio signal is collected by the wearable device, and determining the adjusted volume based on the audio signal and the target volume comprises:
sending the audio signal and the target volume to a second electronic device; and
receiving the adjusted volume from the second electronic device, wherein the adjusted volume is determined by the second electronic device based on the audio signal and the target volume.

4. The method according to claim 1, wherein when the first electronic device is an electronic device other than the wearable device, the target device is the media playing device.

5. The method according to claim 1, wherein when the first electronic device is an electronic device other than the wearable device, the target device is the wearable device.

6. The method according to claim 1, wherein determining the adjusted volume based on the audio signal and the target volume further comprises:

separating out the first signal and the second signal from the audio signal; and determining the adjusted volume based on the target volume, the first signal, and the second signal.

7. The method according to claim 4, wherein determining the adjustment base based on the received volume and the target volume comprises:

determining a volume weakening degree based on the received volume and the target volume; and determining the adjustment base based on the volume weakening degree.

8. The method according to claim 4, wherein determining the enhancement value based on the noise signal on the user side comprises:

determining a noise intensity level based on the noise signal on the user side; and determining the enhancement value based on the noise intensity level.

9. An electronic device, comprising a processor and a memory, wherein the processor is coupled to the memory, the memory is configured to store a computer program, and when the processor executes the computer program, the electronic device is enabled to perform steps in the method according to claim 1.

10. A non-transitory computer-readable storage medium, wherein the non-transitory computer-readable storage medium comprises a computer program, and when the computer program is run on a computer, the computer is enabled to perform steps in the method according to claim 1.

11. A chip, comprising a processor, wherein the processor is coupled to a memory, the memory is configured to store computer program instructions, and when the processor executes the computer program instructions, the chip is enabled to perform steps in the method according to claim 1.

12. A system, wherein the system comprises:

a first electronic device; and a media playing device having a communication connection with the first electronic device, wherein the media playing device is configured to play content at a target volume and send, to the first electronic device, the target volume of when the media playing device plays the content;

wherein the first electronic device is configured to:

receive the target volume of when the media playing device plays the content;

collect an audio signal, wherein the audio signal comprises a first signal and a second signal, the first signal is a sound signal that is collected by a wearable device worn by a user and that is generated when the media playing device plays the content, and the second signal is a noise signal on a user side that is collected by the wearable device;

determine adjusted volume based on the audio signal and the target volume; wherein determining the adjusted volume based on the audio signal and the target volume comprises:

determining a received volume based on the signal;

determining an adjustment base based on the received volume and the target volume;

determining an enhancement value based on the noise signal on the user side; and determining the adjusted volume based on the adjustment base and the enhancement value; and send the adjusted volume to the media playing device through the communication connection, wherein the target volume for when the media playing device plays the content is updated based on the adjusted volume; and wherein the media playing device is further configured to:

in response to receiving the adjusted volume, adjust, based on the adjusted volume, the target volume of when the media playing device plays the content.

13. The system according to claim 12, further comprising:

a second electronic device having a communication connection between the second electronic device and the first electronic device, wherein the first electronic device being configured to determine the adjusted volume specifically comprises the first electronic device being configured to send the audio signal and the target volume to the second electronic device, and wherein the second electronic device is configured to: determine the adjusted volume based on the audio signal and the target volume, and send the adjusted volume to the first electronic device.

14. The system according to claim 13, wherein the first electronic device or the second electronic device is configured to:

separate out the first signal and the second signal from the audio signal; and determine the adjusted volume based on the target volume, the first signal, and the second signal.

15. The system according to claim 13, wherein the first electronic device being configured to determine the adjustment base based on the received volume and the target volume comprises the first electronic device being configured to:

determine a volume weakening degree based on the received volume and the target volume; and determine the adjustment base based on the volume weakening degree.

16. The system according to claim 13, wherein the first electronic device being configured to determine the enhancement value based on the noise signal on the user side comprises the first electronic device being configured to:

determine a noise intensity level based on the noise signal on the user side; and determine the enhancement value based on the noise intensity level.

* * * * *

UNITED STATES PATENT AND TRADEMARK OFFICE
CERTIFICATE OF CORRECTION

| | | |
|---|---|---|
| PATENT NO. | : 12,413,824 B2 | Page 1 of 1 |
| APPLICATION NO. | : 18/552736 | |
| DATED | : September 9, 2025 | |
| INVENTOR(S) | : Lv et al. | |

It is certified that error appears in the above-identified patent and that said Letters Patent is hereby corrected as shown below:

In the Claims

In Column 28, in Claim 12, Line 2, delete "volume;" and insert -- volume, --.

In Column 28, in Claim 12, Line 5, delete "signal;" and insert -- first signal; --.

Signed and Sealed this
Ninth Day of December, 2025

John A. Squires
*Director of the United States Patent and Trademark Office*